(12) United States Patent
McPherson et al.

(10) Patent No.: US 10,729,126 B2
(45) Date of Patent: Aug. 4, 2020

(54) PORTABLE THAWER COMPONENTS AND FEATURES

(71) Applicant: BioLife Solutions, Inc., Bothell, WA (US)

(72) Inventors: Thomas McPherson, San Rafael, CA (US); Brian Schryver, Redwood City, CA (US); Scott Comiso, Menlo Park, CA (US)

(73) Assignee: BioLIfe Solutions, Inc., Bothell, WA (US)

( * ) Notice: Subject to any disclaimer, the term of this patent is extended or adjusted under 35 U.S.C. 154(b) by 259 days.

(21) Appl. No.: 15/872,676

(22) Filed: Jan. 16, 2018

(65) Prior Publication Data

US 2018/0360023 A1    Dec. 20, 2018

Related U.S. Application Data

(60) Provisional application No. 62/446,801, filed on Jan. 16, 2017.

(51) Int. Cl.
*A01N 1/02* (2006.01)
*H05B 3/06* (2006.01)
(Continued)

(52) U.S. Cl.
CPC ......... *A01N 1/0252* (2013.01); *A01N 1/0242* (2013.01); *A01N 1/0284* (2013.01);
(Continued)

(58) Field of Classification Search
CPC .. A01N 1/0252; A01N 1/0242; A01N 1/0284; B01L 7/00; B01L 7/52; H05B 3/06
(Continued)

(56) References Cited

U.S. PATENT DOCUMENTS 1,623,209 A    4/1927    Schuster
5,999,701 A *  12/1999   Schmidt ............... A61M 5/445
                                                    219/535

(Continued)

FOREIGN PATENT DOCUMENTS

EP    3227659     11/2017
WO    9909137 A1  2/1999
(Continued)

OTHER PUBLICATIONS

U.S. Appl. No. 14/712,120 , "Final Office Action", dated Jan. 26, 2018, 22 pages.
(Continued)

*Primary Examiner* — Jeremy Carroll
(74) *Attorney, Agent, or Firm* — Brown & Michaels, PC

(57) ABSTRACT

The present disclosure is related to sample thawing. Features described herein may limit power requirements of the thawing device and may thereby increase the portability of the thawing device. The device may include a housing; a heater block housed within the housing and forming a vial receptacle; a thermally-conductive compliant material may line an inner surface of the receptacle; and a heating element may be coupled with the heater block. The thermally-conductive compliant material may be molded to a shape of a bottom portion of the vial so as to fittingly mate with the bottom portion of the vial. In some embodiments, the heater block does not have moveable components and may be a single non-segmented piece. An ejection pin may be provided configured to break contact between the vial and the thermally-conductive compliant material. Additionally, the receptacle may be localized to the vial region adjacent to the frozen sample.

6 Claims, 2 Drawing Sheets

(51) Int. Cl.
   *B01L 7/00* (2006.01)
   *B01L 9/06* (2006.01)

(52) U.S. Cl.
   CPC .................... *B01L 7/00* (2013.01);
      *B01L 7/52* (2013.01); *H05B 3/06* (2013.01);
      *B01L 9/06* (2013.01); *B01L 2200/02*
      (2013.01); *B01L 2200/04* (2013.01); *B01L*
      *2300/123* (2013.01); *B01L 2300/1805*
      (2013.01); *B01L 2300/1827* (2013.01)

(58) Field of Classification Search
   USPC ........................................................ 422/302
   See application file for complete search history.

(56) References Cited

U.S. PATENT DOCUMENTS

| | | | |
|---|---|---|---|
| 6,082,114 | A | 7/2000 | Leonoff |
| 6,106,784 | A * | 8/2000 | Lund .................. B01L 3/50851 219/428 |
| 8,136,985 | B2 | 3/2012 | Lane et al. |
| 8,563,907 | B2 | 10/2013 | Bushman et al. |
| 2004/0065658 | A1 | 4/2004 | Damiano et al. |
| 2007/0125677 | A1 | 6/2007 | Oronsky et al. |
| 2008/0047948 | A1 | 2/2008 | Rosenbloom et al. |
| 2008/0120984 | A1 * | 5/2008 | Shaham .................. A01N 1/02 62/62 |
| 2011/0011850 | A1 | 1/2011 | Rosenbloom et al. |
| 2011/0309086 | A1 | 12/2011 | Arnitz et al. |
| 2012/0095441 | A1 | 4/2012 | Pendlebury |
| 2013/0084227 | A1 | 4/2013 | Cole et al. |
| 2015/0125138 | A1 | 5/2015 | Karnieli et al. |
| 2015/0334774 | A1 * | 11/2015 | Schryver .................. G01K 7/22 219/439 |
| 2016/0242237 | A1 * | 8/2016 | Su ........................ H05B 1/0247 |

FOREIGN PATENT DOCUMENTS

| | | | |
|---|---|---|---|
| WO | 2013014411 | A2 | 1/2013 |
| WO | 2013126379 | | 8/2013 |
| WO | WO-2013126379 | A1 * | 8/2013 ............. B65D 25/04 |
| WO | 2014068508 | A2 | 5/2014 |
| WO | 2016087873 | A3 | 6/2016 |

OTHER PUBLICATIONS

U.S. Appl. No. 14/712,120, "Non-Final Office Action", dated Jul. 27, 2017, 18 pages.
U.S. Appl. No. 14/712,120, "Non-Final Office Action", dated Jul. 17, 2018, 24 pages.
EP15793552.9, "Extended European Search Report", dated Feb. 5, 2018, 9 pages.
Triana et al., "Thawing of Cryopreserved Hematopoietic Progenitor Cells from Apheresis With a New Dry-Warming Device", Transfusion, vol. 53, No. 1, Jan. 2013, pp. 85-90.

* cited by examiner

PORTABLE THAWER COMPONENTS AND FEATURES

CROSS-REFERENCE TO RELATED APPLICATIONS

This application claims priority to U.S. Provisional Application No. 62/446,801, filed on Jan. 16, 2017. This application is also related to U.S. patent application Ser. No. 15/602,711, filed May 23, 2017, and U.S. patent application Ser. No. 14/712,120, filed May 14, 2015, the full disclosures which are incorporated herein by reference in their entirety for all purposes.

BACKGROUND

The present disclosure is generally related to systems and methods for thawing a frozen sample in a vial.

Cryogenic preservation of cells in suspension is a well-established and accepted technique for long term archival storage and recovery of live cells. As a general method, cells are suspended in a cryopreservation media typically including salt solutions, buffers, nutrients, growth factors, proteins, and cryopreservatives. The cells are then distributed to archival storage containers of the desired size and volume, and the containers are then reduced in temperature until the container contents are frozen. Typical long-term archival conditions include liquid nitrogen vapor storage where temperatures are typically between −196 and −150 degrees Celsius.

The successful recovery of live cells preserved by such methods may be dependent upon minimizing injurious ice crystal growth in the intracellular region during both the freezing and thawing processes. Some advances have been made to reduce intracellular ice crystal growth during the freezing process. For example, intracellular ice crystal growth may be reduced by adding a cryoprotectant compound to the tissues or cell suspension solution that inhibits ice crystal nucleation and growth both extracellularly and intracellularly. Additionally, the growth of intracellular ice can be controlled through management of the rate of sample temperature reduction. During the freezing process extracellular ice crystal formation will exclude solutes and cells from the developing ice crystal structure thereby concentrating the solutes and cells in the remaining liquid phase. The increase in solute concentration will establish an osmotic potential that will promote the dehydration of the cells while allowing time for cell membrane-permeable cryoprotectants to equilibrate in concentration within the intracellular volume. As the freezing process progresses a temperature will be reached at which the high solute concentration will solidify in a glass state with minimal size of ice crystal nuclei within the intracellular volume. The solid-state cell suspension is then further reduced in temperature until the cryogenic storage temperature is reached. At this temperature molecular activity is sufficiently reduced that the cells may be stored indefinitely. For optimal cell recovery following cryogenic storage, the rate of temperature reduction during the freezing process must fall within a range of values. If the temperature reduction rate is too fast, the cells may freeze before the level of intracellular water has been sufficiently reduced, thereby promoting the growth of intracellular ice crystals. If the rate of temperature reduction is too slow, the cells may become excessively dehydrated and the extracellular solute concentration may become too high, with both cases leading to damage of critical cellular structures. For this reason, the temperature reduction rate during the freezing process is typically controlled. For example, one method of controlling the rate of temperature reduction includes surrounding the sample with an insulating material and placing the assembly in a static temperature environment, while another method includes placing the exposed sample container into an isolation chamber in which the interior temperature is reduced at a controlled rate.

Returning the sample from the cryogenic archival state involves thawing the sample to a fully liquid state. During the thawing process, again the rate of temperature change can influence the viability of the cryogenically preserved cells. The solid contents of the sample storage vessels contains large islands of crystallized water which are interposed by channels of glass state aqueous solutes intermixed with small nuclei of ice crystals. During the transition from the cryogenic storage temperature to the conclusion of the phase change to a completely liquid state, there is an opportunity for rearrangement of the water molecules within the sample including a thermodynamically favored extension of the small ice nuclei within the cells. As the growth of the intracellular ice crystals have an associated potential for cell damage, and as the degree of crystal growth is a time-dependent the phenomenon, minimizing the time interval of the transition through the phase change is desirable. A rapid slew rate in the sample vessel temperature is typically achieved by partial submersion of the vessel in a water bath set to a temperature of approximately 37 degrees Celsius. Although a faster rate of thawing can be achieved by increasing the temperature of the bath, submersion of the vessel in the bath will establish temperature gradients within the vessel with the highest temperatures being located at the vessel wall. As a result, transient thermodynamic states will occur wherein the temperature of the liquid-solid mixture will exceed the melting temperature even though frozen material is present in close proximity. The intra-vessel temperature gradient therefore places an upper limit on the bath temperature. In addition, as common cryoprotectants have a known toxic influence on the cells, differential exposure of the cells in the liquid state with respect to time and temperature allows for variation in the viability of the cells upon completion of the thaw process. As the toxic effect of the cryoprotectants is enhanced at elevated temperatures, a lower liquid temperature is desirable. For this reason, common thawing protocols typically include a rapid thaw phase that is terminated when a small amount of solid material still remains in the sample container. Following removal from the water bath, the sample temperature will quickly equilibrate to a temperature that is near to the phase change temperature. Thawing protocols typically seek to minimize the duration at which the thawed sample is held in a state where the cryoprotectant is concentrated, and subsequent steps to dilute the sample or exchange the cryopreservation media for culture media are commonly applied in as short of an interval as possible.

While some thawing devices have been proposed to automate sample thawing, further improvements may be had.

SUMMARY OF THE DISCLOSURE

For thawing cells, conventional practice is to warm the cells quickly in a warm water bath (e.g., 37 deg. C) to just about the point at which the last bit of ice is about to melt and then to dilute the cells slowly into growth media. If the sample is allowed to get too warm, the cells may start to metabolize, and be poisoned by the DMSO (dimethyl sulfoxide) that is used in the freezing process. Generally, the thawing of cryogenically preserved cells and tissue is performed by lab technicians and the applied protocol can not only vary between each lab technician, but may also be technique dependent. The completion of sample thaw is generally subjectively judged by each individual technician and may result in variation in the thaw rate or samples which have been allowed to become too warm. Although a repeatable thawing profile is theoretically possible to achieve using a bath and manual control of the vial insertion, expected variance in both technique and degree of protocol compliance, particularly combined with the requirement to frequently remove the vial from bath to monitor the thaw status, makes deviation from the standard profile a near certainty. The removal of the vial from the bath interrupts the thermal energy transfer from the bath water to the vial and visual assessment of the thaw status is often difficult and may be complicated by the presence of vial labels and printed writing surfaces that are provided as integrated features of the vial product. Further water baths are also a source of contamination and inadvertent submersion of the vial body-cap junction can result in the introduction of bath liquid into the vial contents during removal of the vial cap.

Systems, devices, and methods that provide simplified, automated, and/or more consistent sample thawing may be advantageous and may increase cell recovery. While some thawing devices and methods have been proposed, further improvements may be desirable. For example, in some instances, it may be advantageous to increase a heat transfer rate, especially when thawing larger cells and/or multicellular organisms. Additionally, it may be advantageous to increase the portability of a thawing device such that the device may be used in field applications, such as remote vaccination using live-cells or organisms. Embodiments of the disclosure may address one or more of these issues.

In some embodiments, a battery-operated hand-held dry thawing instrument is provided. The device may be conFIG.d to thaw samples from liquid nitrogen temperatures at the proper rate for optimal efficacy. The instrument may dry-thaws samples in a field setting where water-based solutions are not available.

In certain embodiments, the unit adapts to the end of a small vial in order to localize the heating of small volumes (20-200 uL). The design may conserve energy such that the unit can run from battery power with the capacity to provide 200 to 335 joules over a range of 25 to 100 thaws. The conductive vial receptacle may have a conformal medium pre-molded to the contour of the vial. The vial may be inserted directly into the heat cup and may be retained with jaws that provide a downward force which keeps the vial in contact with the conformal medium maintaining thermal contact.

In some aspects, a sample thawing device for thawing a frozen sample in a vial is provided. The sample thawing device may include a housing, a heater block housed within the housing and forming a vial receptacle; and a thermally-conductive compliant material lining an inner surface of the vial receptacle formed by the heater block. The thermally-conductive compliant material may be molded to a shape of a bottom portion of the vial so as to fittingly mate with the bottom portion of the vial. The device may also include a heating element thermally coupled with the heater block and being conFIG.d to heat the heater block to thaw the frozen sample in the vial.

In some embodiments, the thermally-conductive compliant material comprises one or more protrusions for filling a cavity or undercut feature of a bottom of the vial.

In further aspects, a sample thawing device for thawing a frozen sample in a vial is provided. The sample thawing device may include a housing; a heater block housed within the housing and forming a vial receptacle; a thermally-conductive compliant material lining an inner surface of the receptacle formed by the heater block; and a heating element thermally coupled with the heater block and being conFIG.d to heat the heating block to thaw the frozen sample in the vial. The heater block of the thawer may not have moveable components. For example, in some embodiments, the heater block is a single non-segmented piece.

In still further aspects, a sample thawing device for thawing a frozen sample in a vial is provided that includes a housing; a heater block housed within the housing and forming a vial receptacle with an opening in the bottom of the vial receptacle; a thermally-conductive compliant material lining an inner surface of the vial receptacle formed by the heater block; an ejection pin conFIG.d to break contact between the vial and the thermally-conductive compliant material by extending through the opening of the vial receptacle to eject the vial from the vial receptacle formed by the heater block; and a heating element thermally coupled with the heater block and being conFIG.d to heat the heating block to thaw the frozen sample in the vial.

In still further aspects, a sample thawing device for thawing a frozen sample in a vial is provided that includes a housing and a heater block housed within the housing and forming a vial receptacle. The receptacle may have a height less than half a height of the vial such that less than half the vial is disposed within the vial receptacle when the vial is received therein. The device may further include a thermally-conductive compliant material lining an inner surface of the vial receptacle formed by the heater block and a heating element thermally coupled with the heater block and being conFIG.d to heat the heating block to thaw the frozen sample in the vial.

Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The invention will be better understood upon reading the following description and examining the figures which accompany it. These figures are provided by way of illustration only and are in no way limiting on the invention.

BRIEF DESCRIPTION OF THE DRAWINGS

Further details, aspects, and embodiments of the invention will be described by way of example only and with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE DISCLOSURE

Figure 1:
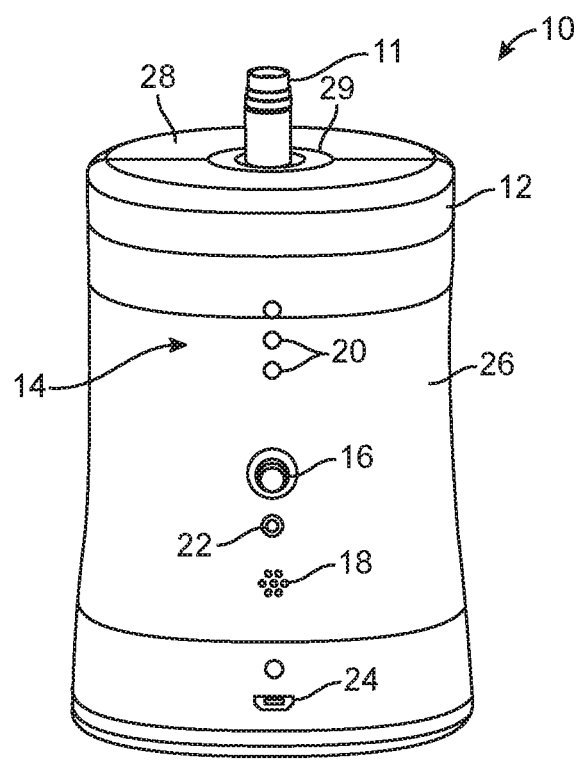
FIG. 1 shows an exemplary thawer according to some embodiments of the present invention.

FIG. 1 shows an exemplary thawer 10 according to some embodiments of the present invention. Thawer 10 may be configured to heat a biological material in a vessel. In various embodiments, thawer 10 may be configured to thaw a frozen sample in a vial 11. In some embodiments, the thawer 10 is configured to quickly and consistently thaw frozen samples.

Thawer 10 may have a housing 12 and a user interface 14 may be provided at a surface of the housing 12. Housing 12 may include a front cover 26 and a back cover 28. The front cover 26 and the back cover 28 may define a vial collar 29 at the top of thawer 10. Vial collar 29 may define an opening for receiving vial 11 and for aligning vial 11 with a heater block disposed within housing 12, as will be discussed in further detail below.

The user interface 14 may include various inputs and outputs, such as a multifunctional button 16, audio speaker 18, one or more light indicators 20, a manual release 22, and an electrical port 24. The multifunctional button 16 may initiate a heating cycle of the thawer 10. The heating cycle may include one or more heating intervals. The audio speaker 18 and the one or more light indicators 20 may output signals associated with the thawing process, e.g., a start and/or stop time, thawing state, start/stop of various heating intervals, etc. In some embodiments, the light indicators 20 comprise one or more LED light sources. Manual release 22 may allow a user to manually disengage vial 11 from the thawer 10 as will be described in further detail below. Electrical port 24 may be configured to receive an electrical plug. A received electrical plug may deliver power to the thawer 10, e.g., to power the thawing process or to recharge on-board batteries of the thawer 10. In some embodiments, the electrical port 24 may be configured to receive a data cable so that a user can adjust thawing parameters. In some embodiments, the electrical port 24 may be a standard 12 volt port, or a USB port (e.g., standard, mini-, micro-, etc.), or the like.

Figure 2:
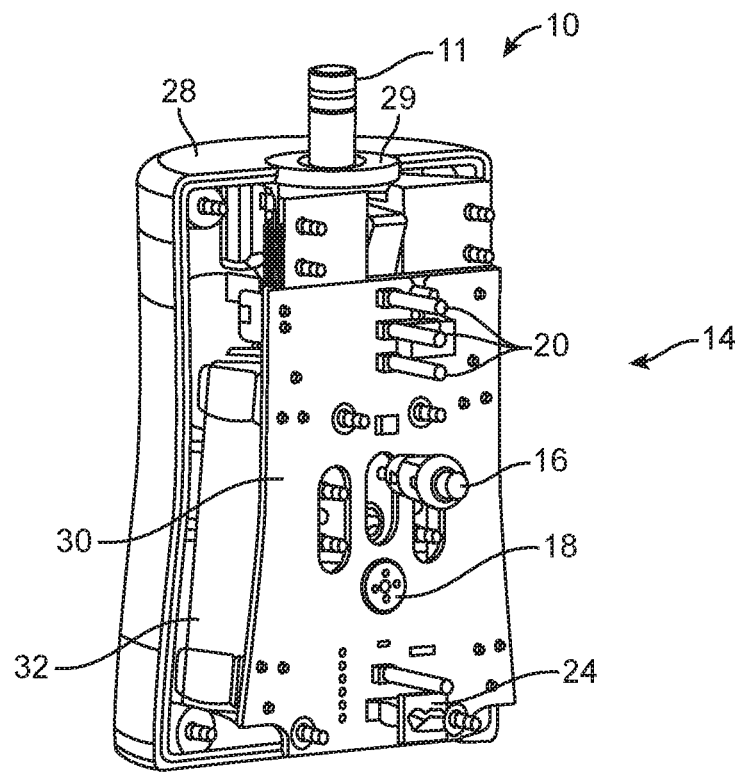
FIG. 2 shows the exemplary thawer of FIG. 1 with the front cover removed.

FIG. 2 shows the exemplary thawer 10 of FIG. 1 with the front cover 26 removed. As can be seen in FIG. 2, a printed circuit board assembly 30 may support many components of the user interface 14 such as the multipurpose button 16, the speaker 18, light indicator(s) 20, and electrical port 24. Moreover, the printed circuit board assembly 30 may include other electronics of the thawer 10, such as a processor/controller. Additionally, as mentioned above, housing 12 of thawer 10 may house one or more rechargeable batteries 32 which may power the thawing process and which may be recharged via electrical port 24. The rechargeable batteries 32 may be lithium ion batteries or the like.

Figure 3:
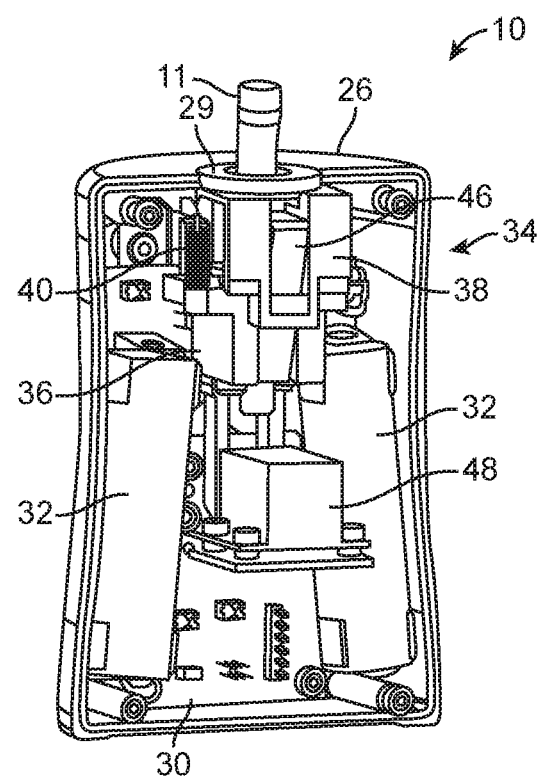
FIG. 3 shows the exemplary thawer of FIG. 1 with the back cover removed.
Figure 4:
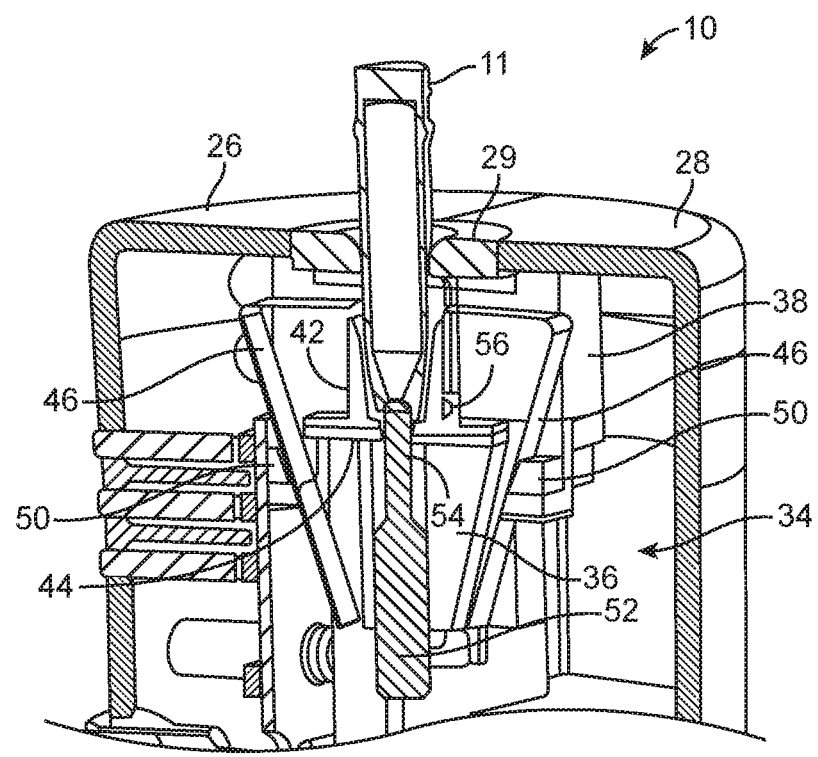
FIG. 4 shows a cross-sectional view of the exemplary thawer of FIG. 1.

FIG. 3 shows the exemplary thawer 10 of FIG. 1 with the back cover 28 removed. As illustrated, a vial thawing assembly 34 may be housed within the housing 12. FIG. 4 shows a cross-sectional view of the exemplary thawer 10 of FIG. 1 to illustrate additional details of the thawing assembly 34. The vial thawing assembly 34 may include a moveable platform 36 coupled to a stationary frame 38 by one or more extension springs 40.

The moveable platform 36 may support a heater block 42, a heating element 44, and one or more vial retaining jaws 46. The heater block 42 may form a vial receptacle configured to receive the bottom portion of the vial 11. In various embodiments, it may be desirable to reduce the thermal mass of the heater block 42 to allow for shorter pre-heating intervals and reducing the amount of energy required to bring the heater block to temperature. To do so, the vial receptacle formed by heater block 42 may be localized to the region of the vial 11 that is adjacent to the frozen contents. For example, in some embodiments, the vial receptacle formed by heater block 42 may have a height less than half a height of the vial 11 such that less than half the vial 11 is disposed within the vial receptacle when the vial 11 is received therein. Optionally, the height of the vial receptacle formed by heart block 42 may be a quarter or less than the height of the vial 11 such that a quarter or less of the vial 11 is disposed within the vial receptacle when the vial 11 is received therein. The reduced energy requirement may allow a battery source (e.g., one or more batteries 32) to power the thawer 10 through many thawing cycles to make the thawer 10 truly portable. Such portability may be beneficial for thawer 10 use in field applications such as remote vaccination using live-cells or organisms.

Additionally, the smaller size of the heater block 42 allows a very short conduction pathway between the sample and the heating source 44 which translates to a very efficient energy transfer, minimal heat loss/waste, as well as a reduced temperature gradient between the heater 44 and the vial 11. This property is beneficial for the heat transfer rate that is necessary for a very rapid temperature transitions from liquid nitrogen temperatures to phase transition. This rapid transition may be important for the viability of larger cells and multicellular organisms when transitioning from the cryogenic storage state. In some embodiments, the thawing rate ranges may include a thawing rate of 300-400 degrees Celsius per minute.

In some embodiments, the heater block 42 may form a flange about a bottom of the vial receptacle. In certain embodiments, the heater block 42 does not include moveable components for clamping the vial 11. For example, the heater block 42 may be a single, non-segmented metal block. The heater block 24 may comprise a thermally conductive material such as but not limited to aluminum, aluminum alloys, copper, and copper alloys. The heater block 24 in the embodiment shown in FIG. 4 has a height of 1-2 cm and a diameter of 0.8 to 1.5 cm. In some embodiments, the heater block 42 comprises a metal block, such as an aluminum metal block.

An inner surface of the vial receptacle formed by the heater block 42 may be lined with a thermally-conductive compliant material. In some embodiments, the thermally-conductive compliant material is molded to specifically and fittingly mate with a bottom of vial 11 to remove air gaps between the bottom of the vial 11 and the thermally-conductive compliant material. For example, in certain embodiments, the thermally-conductive compliant material may be molded to be concave with one or more protrusions extending inwardly from the inner surface of the thermally-conductive compliant material for extending into one or more cavities or undercut features on a bottom portion of the vial 11. In some embodiments, the thawer 10 may be used with vials 11 which have a conical or rounded sample holding bottom which couples to a flat disc base. The flat disc base may have a barcode or other vial information. A cavity or undercut may be formed between the flat disc base and the conical or rounded sample holding bottom of the vial. The thermally-conductive compliant material may be molded (e.g., with a protrusion or lip) to fittingly mate with the cavity or undercut portion of the vial to remove the air gaps between the bottom of the vial and the thermally-conductive compliant material. In some embodiments, the thermally-conductive compliant material comprises thermally conductive compliant material, such as, but not limited to a molded silicone, or solids-filled silicone compounds.

Heating element 44 may be coupled with a bottom portion of heater block 42. In some embodiments, the heating element 44 couples with the bottom of the vial receptacle formed by heater block 42. In some embodiments the flange of heater block 42 may increase a contact area between the heating element 44 and the heater block 42 to reduce heating times. While illustrated as thermally coupling with a bottom portion of the heater block 42, other embodiments may employ a heating element 44 that couples with the outer surface of the vial receptacle formed by the heater block 42. In some embodiments, the heating element 44 may have an opening for an ejection system that ejects the vial from the vial receptacle, discussed in further detail below. In some embodiments, the heater 44 comprises a resistive heating element such as a cast ceramic heater disc or cartridge, or flat silicone resistive heater pad.

The one or more vial retaining jaws 46 may be spring jaws used to retain the vial 11 in the vial receptacle formed by the heater block 42 during a thaw cycle. The one or more vial retaining jaws 46 may have a Y-configuration and may be biased toward an open configuration prior to the thawer 10 receiving the vial 11. When the vial 11 is received by thawer 10, the one or more vial retaining jaws 46 may be moved toward a closed configuration to retain the vial 11 in the vial receptacle, as will be described in further detail below in description of the operation of the device.

When thawer 10 is not in use, the spring(s) 40 may hold the moveable platform 36 in a pre-thaw position relative to the stationary frame 38 and the one or more retaining jaws 46 may be in an open configuration. In use, when a vial 11 is inserted downwardly through collar 29 and into the vial receptacle formed by heater block 42 for thawing, the moveable platform 36 is moved down relative to the stationary frame 38, extending springs 40. A latch 48 supported by the stationary frame 38 may couple with a portion of the moveable platform 36 when the moveable platform 36 is moved downwardly from the pre-thaw position. The latch 48, once engaged to the moveable platform 36, may maintain the moveable platform 36 in a thawing position (below the pre-thaw position). Additionally, as the moveable platform 36 is moved down relative to the stationary frame 38, a surface of the one or more vial retaining jaws 46 slide against an abutment 50 of the stationary frame 38. The abutment 50 forces the one or more retaining jaws 46 from the open configuration toward a closed configuration to retain the vial 11 as the moveable platform 36 transitions from the pre-thaw position to the thawing position. Upon thawing completion, the latch 48 may disengage from the moveable frame 36, and the springs 40 may relax and move the moveable frame 36 upward relative to the stationary frame 38 from the thawing position back to the pre-thawing position where a user may retrieve the vial 11 with the thawed sample.

Accordingly, in some embodiments, the retaining jaw(s) 46 may be a passive component that does not require electrical power, thereby reducing the power requirements of thawer 10. Additionally, transition of the moveable platform 36 from the pre-thaw position to the thawing position may be rely on the user pressing the vial 11 into the thawer 10 until the latch 48 engages with the moveable platform 36. Moreover, latch 48 may be configured to passively retain the moveable platform 36 in a thawing position (below the pre-thaw position). Optionally, latch 48 may be configured to be momentarily energized to disengage from the moveable platform 36 so as to limit power requirements of the thawer 10 during thawing. Latch 48 may also be disengaged from the moveable platform 36 via the manual release 22. The manual release 22 may allow a user to manually release the latch 48 to further limit power requirements, or if the thawer 10 is powered off or if the latch 48 is jammed. Each of these features may further increase the portability of thawer 10.

Optionally, to further automate the thawing process, thawer 10 may include an ejection system 52 to break the contact between the thermally-conductive compliant material and the vial 11 upon thawing completion. The ejection system 52 may be disposed below the heater block 42 and may include a pin 54 that extends through an opening at the bottom of the heater block 42 and/or an opening of the heating element 44. Upon completion of the thawing cycle, the ejection system 52 may be energized to push pin 54 upward through the opening of the heater block 42 and/or the opening of the heating element 44 to break the contact between the thermally-conductive compliant material and the vial 11, thereby providing a simple and reliable feature to stop heat transfer and prevent over-heating of the sample.

As mentioned above, a processor may be mounted to PCBA 30 and may automate the thawing process. In some embodiments a temperature sensor 56 may be provided in the heater block 42 and may report a sensed temperature of the heater block 42 to the processor to further increase a consistency of the thawing process. The temperature sensor 56 may be a thermistor or the like.

In some embodiments, the processor may initiate a pre-heating interval when the multifunctional button is actuated by a user. The processor may receive temperature readings from the temperature sensor 56 and may control power delivered to the heating element 44 to pre-heat the heater block 42 to a desired temperature. After completion of the pre-heating of the heater block 42 with the heating element 44, the processor may output a signal (e.g., visual signal via indicators 20 and/or audio signal via speaker 18) to the user to indicate the completion of the pre-heating interval. Thereafter, the user may insert the vial 11 into the thawer 10 and may lock the vial 11 into the thawer 10 by pressing down on the vial 11 until the latch 48 engages with the moveable platform 36 and the retaining jaws couple with the vial 11. The processor may start a thawing cycle timer upon the latch 48 engagement with the moveable platform 36 and may regulate a temperature of the heater block 42 based on signals from the sensor 56. After expiration of the thawing cycle timer, the processor may energize the latch 48 to disengage the moveable platform 36, thereby moving the moveable platform 36 from the thawing position to the pre-thaw position via springs 30. The processor may also output a signal (e.g., visual signal via indicators 20 and/or audio signal via speaker 18) to the user to indicate the completion of the thawing cycle. Additionally, if equipped, the processor may energize the ejection system 52 to break the contact between the thermally-conductive compliant material and the vial 11 to avoid over-heating of the sample.

One or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including but not limited to application-specific circuits. Combinations of computer-executed software and hard-wired logic or other circuitry may be suitable as well.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. Additionally or alternatively, the computing device(s) may comprise circuitry that renders the device(s) operative to implement one or more of the methods of the present subject matter.

Any suitable computer-readable medium or media may be used to implement or practice the presently-disclosed subject matter, including but not limited to, diskettes, drives, and other magnetic-based storage media, optical storage media, including disks (e.g., CD-ROMS, DVD-ROMS, variants thereof, etc.), flash, RAM, ROM, and other memory devices, and the like.

The subject matter of the present invention is described here with specificity, but the claimed subject matter may be embodied in other ways, may include different elements or steps, and may be used in conjunction with other existing or future technologies.

This description should not be interpreted as implying any particular order or arrangement among or between various steps or elements except when the order of individual steps or arrangement of elements is explicitly described. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A sample thawing device for thawing a frozen sample in a vial, the sample thawing device comprising:
   a housing;
   a heater block housed within the housing and forming a vial receptacle;
   a thermally-conductive compliant material lining an inner surface of the vial receptacle formed by the heater block, the thermally-conductive compliant material molded to a shape of a bottom portion of the vial so as to fittingly mate with the bottom portion of the vial;
   and
   a heating element thermally coupled with the heater block and being configured to heat the heating block to thaw the frozen sample in the vial.

2. The sample thawing device of claim 1, wherein the thermally-conductive compliant material comprises one or more protrusions for filling a cavity or undercut feature of a bottom of the vial.

3. A sample thawing device for thawing a frozen sample in a vial, the sample thawing device comprising:
   a housing;
   a heater block housed within the housing and forming a vial receptacle;
   a thermally-conductive compliant material lining an inner surface of the receptacle formed by the heater block; and
   a heating element thermally coupled with the heater block and being configured to heat the heating block to thaw the frozen sample in the vial; and
   wherein the heater block does not have moveable components.

4. The sample thawing device of claim 3, wherein the heater block is a single non-segmented piece.

5. A sample thawing device for thawing a frozen sample in a vial, the sample thawing device comprising:
   a housing;
   a heater block housed within the housing and forming a vial receptacle with an opening in the bottom of the vial receptacle;
   a thermally-conductive compliant material lining an inner surface of the vial receptacle formed by the heater block;
   an ejection pin configured to break contact between the vial and the thermally-conductive compliant material by extending through the opening of the vial receptacle to eject the vial from the vial receptacle formed by the heater block; and
   a heating element thermally coupled with the heater block and being configured to heat the heating block to thaw the frozen sample in the vial.

6. A sample thawing device for thawing a frozen sample in a vial, the sample thawing device comprising:
   a housing;
   a heater block housed within the housing and forming a vial receptacle, the receptacle having a height less than half a height of the vial such that less than half the vial is disposed within the vial receptacle when the vial is received therein;
   a thermally-conductive compliant material lining an inner surface of the vial receptacle formed by the heater block; and
   a heating element thermally coupled with the heater block and being configured to heat the heating block to thaw the frozen sample in the vial.

* * * * *